US006185775B1

(12) United States Patent
McCarthy

(10) Patent No.: US 6,185,775 B1
(45) Date of Patent: Feb. 13, 2001

(54) UTILITY RAMP

(75) Inventor: Michael D. McCarthy, Kiel, WI (US)

(73) Assignee: Metko, Inc., New Holstein, WI (US)

( * ) Notice: Under 35 U.S.C. 154(b), the term of this patent shall be extended for 0 days.

(21) Appl. No.: 09/452,304

(22) Filed: Dec. 1, 1999

(51) Int. Cl.[7] .................................................. E01D 1/00
(52) U.S. Cl. ............................................. 14/69.5; 414/537
(58) Field of Search ........................... 414/537; 14/69.5; 296/41, 39.2, 207, 61

(56) References Cited

U.S. PATENT DOCUMENTS

| 1,261,967 | | 4/1918 | Stoltze . | |
|---|---|---|---|---|
| 3,943,589 | * | 3/1976 | Pedersen | 14/69.5 |
| 4,078,678 | * | 3/1978 | Tordella | 214/85 |
| 4,368,553 | * | 1/1983 | Perry | 14/69.5 |
| 4,429,013 | * | 1/1984 | Adell | 428/122 |
| 4,528,711 | * | 7/1985 | Packer | 14/69.5 |
| 4,853,999 | | 8/1989 | Smith . | |
| 5,277,436 | * | 1/1994 | Frank et al. | 280/5.2 |
| 5,608,937 | * | 3/1997 | Seigneur et al. | 14/69.5 |
| 5,645,394 | | 7/1997 | Hays . | |
| 5,671,496 | * | 9/1997 | Smith | 14/69.5 |
| 5,768,733 | * | 6/1998 | Kneebone | 14/69.5 |
| 5,938,397 | * | 8/1999 | Schouest | 414/537 |
| 5,954,382 | * | 9/1999 | Combs | 296/39.2 |
| 5,971,465 | * | 10/1999 | Ives et al. | 296/61 |

FOREIGN PATENT DOCUMENTS

| 4234592 | 9/1993 | (DE) . |
|---|---|---|
| 978882 | 12/1964 | (GB) . |

OTHER PUBLICATIONS

Catalog page—Handsome Rewards (19465 Brennan Avenue, Perris, CA 92599) Year of catalog and page number unavailable.
PENCO Safety Type Bridge Ramps, Aug. 1948.*

* cited by examiner

Primary Examiner—Eileen D. Lillis
Assistant Examiner—Gary S. Hartmann
(74) Attorney, Agent, or Firm—Ryan Kromholz & Manion, S.C.

(57) ABSTRACT

A portable ramp for providing a bridge between surfaces of different elevations. The ramp includes a unitary construction which includes a traction plate, foot section and tongue section. The foot section has one or more serrations along a curved surface. The tongue section includes a binder for increased friction at the elevated surface. A safety line and hand hold are also disclosed.

18 Claims, 4 Drawing Sheets

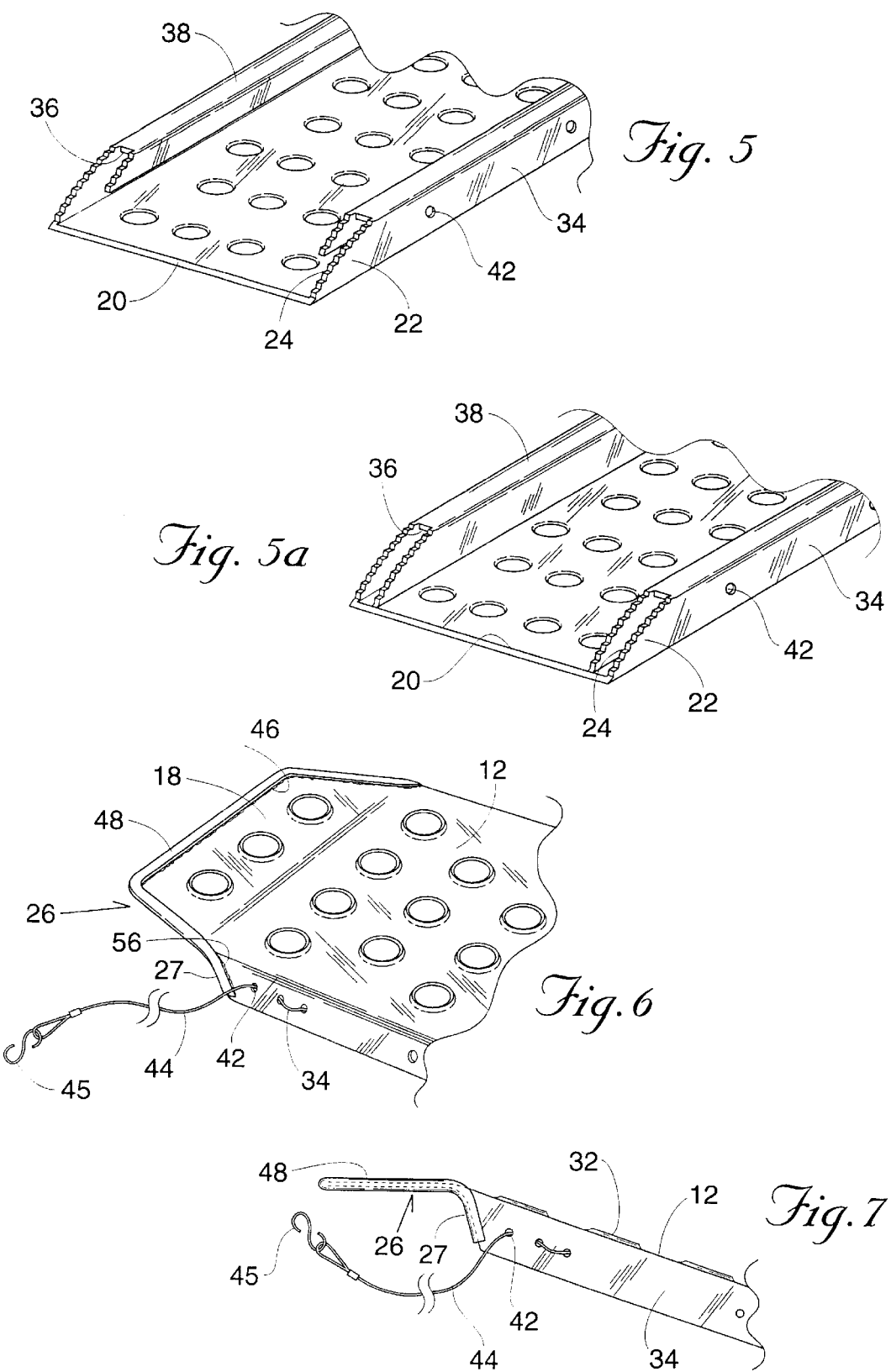

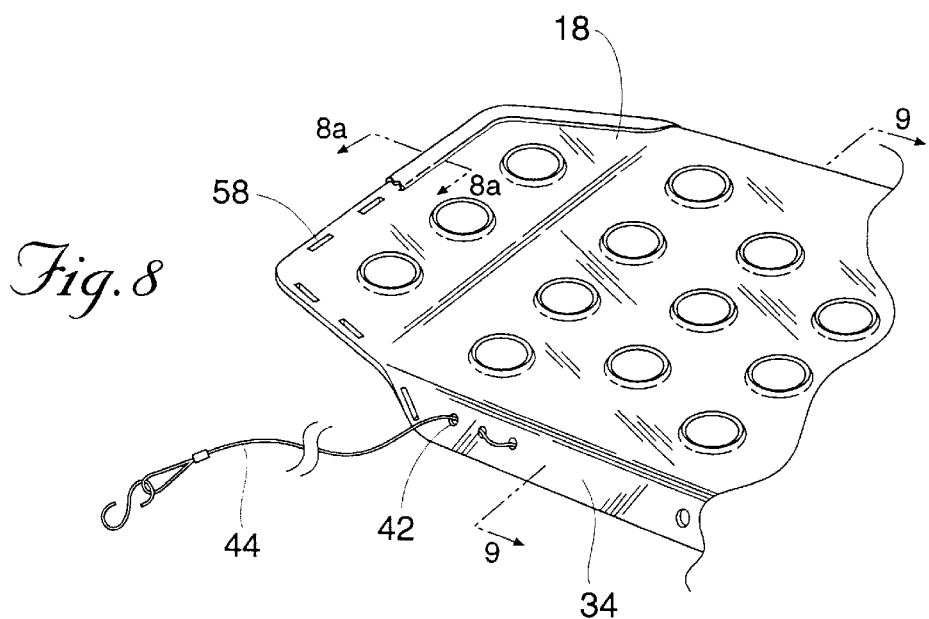
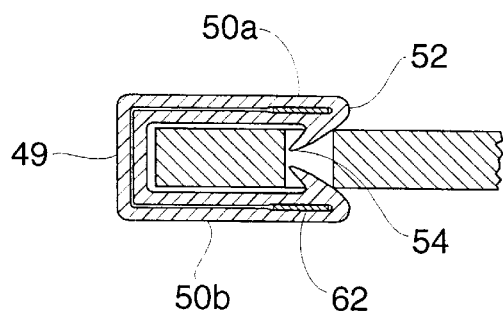
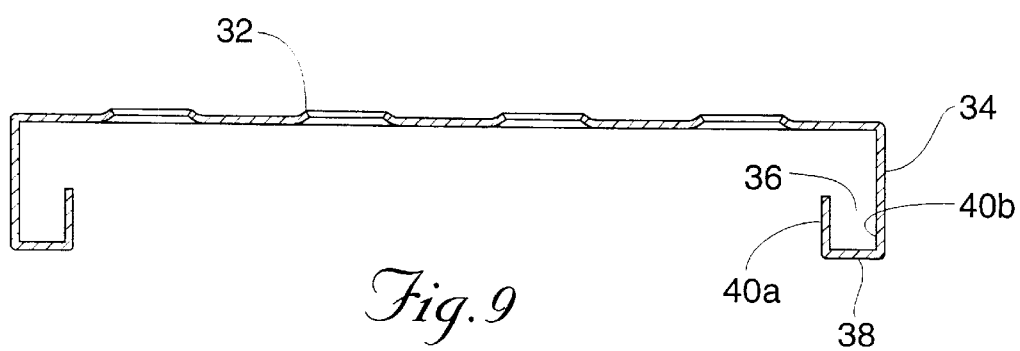

UTILITY RAMP

BACKGROUND OF THE INVENTION

This invention relates generally to a portable ramp for providing a bridge between surfaces of different elevations such as a ground level surface and a raised surface. Devices of this basic type have been commonly used for transport of heavy or wheeled objects from one level to another. One such device is disclosed in the patent granted to Edward Smith (U.S. Pat. No. 4,853,999). Here a ramp having a plurality of plates is disclosed. A lower plate section contacts the ground on one end and is jointedly connected to an upper plate section. A separate support rail extends between the plate sections. Other devices, such as the wagon-skid of U.S. Pat. No. 1,261,967, contemplate the addition of conveyor means to the ramp.

SUMMARY OF THE INVENTION

The present invention provides an improved utility ramp which is portable, lightweight, and more importantly, provides a unitary construction which is durable and reliable. The present invention further provides an improved foot portion which engages the ground surface with serrations on a curved surface. This improved foot portion grippingly engages the ground over a wide range of raised heights, thus increasing the usefulness of a ramp of this type.

Further, the present ramp includes a tongue portion or receptacle which is adapted to be received and engaged by the raised surface. The traction plate includes oppositely disposed, downwardly formed, substantially coextensive apron portions. Each of these apron portions further defines a substantially coextensive, generally U-shaped channel. The U-shaped channel is formed by a base portion having a pair of bifurcated leg portions extending therefrom. Each of the bifurcated legs further includes an arcuate portion whereupon a plurality of serrations is formed.

As discussed above, the serrations engage the ground surface at any point in the arcuate surface touching the ground. In this manner the serrations engage the ground at any of a variety of heights. That is, as the height between the ground surface and the raised surface increases, the arcuate portion rotates to maximize the area engaging the ground surface.

It is an object of the present invention to provide a utility ramp having unitary construction of the receptacle, plate and foot members. It is a further object to provide a ramp that has a foot member capable of gripingly engaging the ground level surface at substantially any angle relative to the raised surface. It is an object of the present invention to provide a ramp having a tongue section or receptacle capable of frictionally engaging with the raised surface. It is yet a further object to provide a utility ramp that is facilely connected to and disconnected from the raised surface. These and other objects will be apparent in the descriptions that follow.

DESCRIPTION OF THE DRAWINGS

FIG. 5 is a fragmentary view showing the underside of the foot end of the utility ramp.

FIG. 5*a* is a fragmentary view showing the underside of an alternative foot end of the utility ramp.

FIG. 6 is a fragmentary perspective view of the tongue portion of the present invention and showing the protective binder attached to the marginal edge thereof.

FIG. 7 is a fragmentary side plan view of the tongue portion of the present invention.

FIG. 8 is a fragmentary perspective view of the tongue portion of the present invention and showing an alternate embodiment protective binder on a portion thereof.

FIG. 8*a* is a cross sectional view, taken along lines 8*a*—8*a* of FIG. 8.

FIG. 9 is a cross sectional view of the ramp shown in FIG. 8 and taken along lines 9—9 thereof.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

Figure 1:
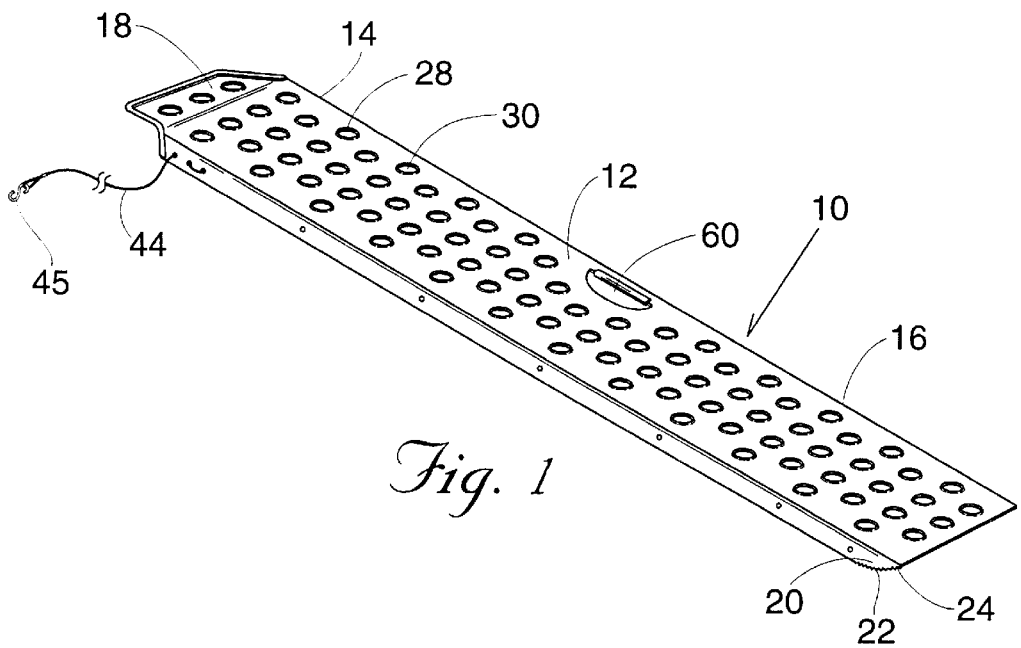
FIG. 1 is a perspective view of one embodiment of the utility ramp of the present invention and showing a straight traction plate.
Figure 2:
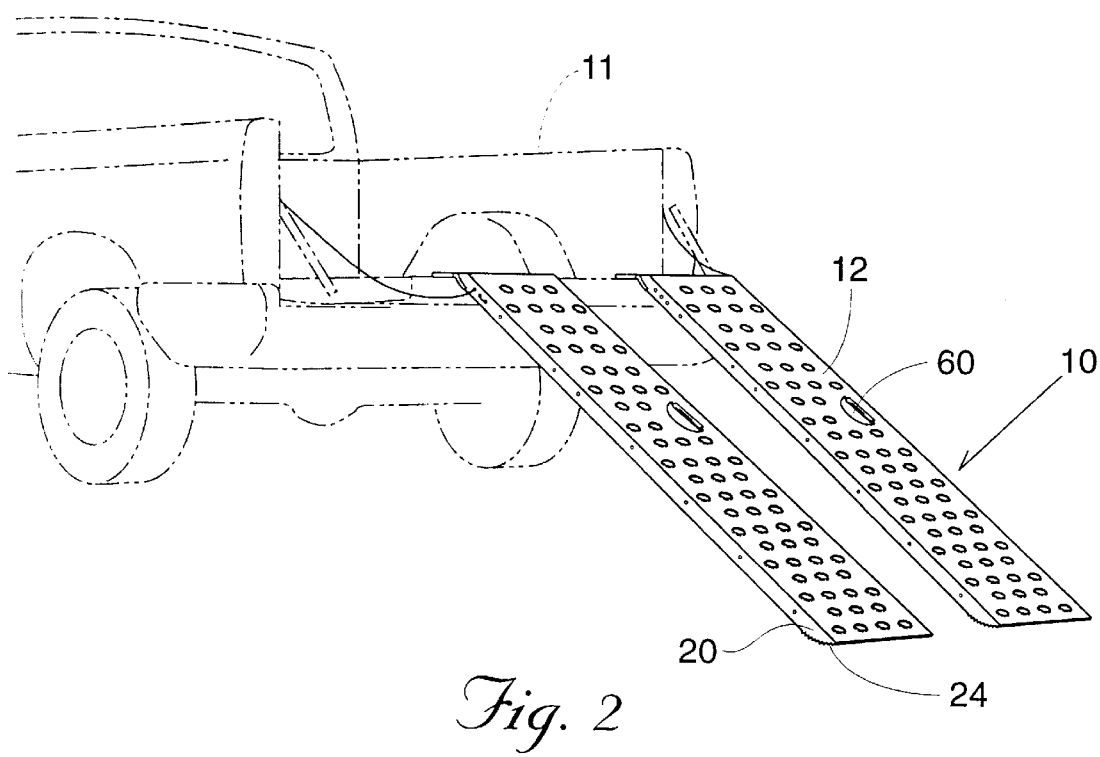
FIG. 2 is a perspective view of the embodiment illustrated in FIG. 1, but shown in conjunction with a pickup truck, seen in phantom.
Figure 3:
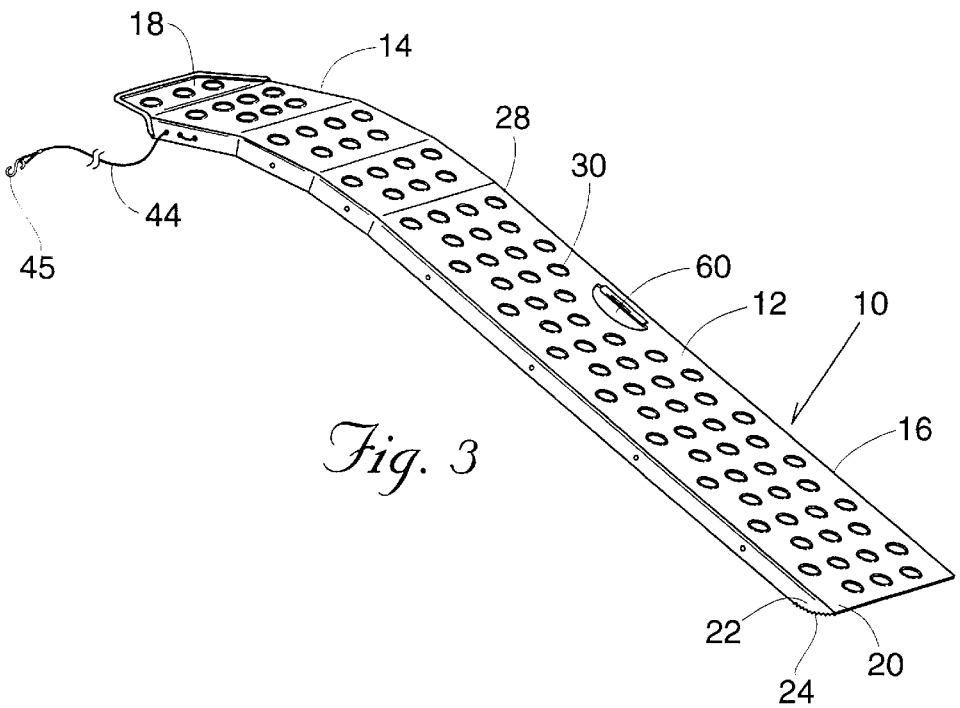
FIG. 3 is a perspective view of an alternate embodiment of the utility ramp of the present invention and showing a curved traction plate.
Figure 4:
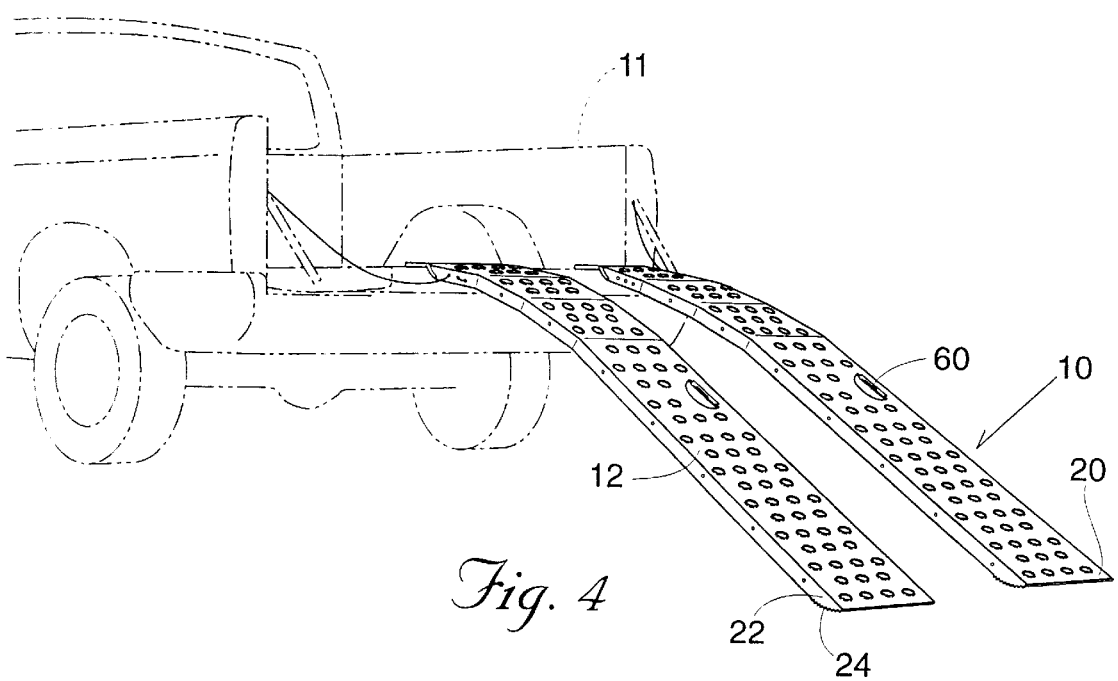
FIG. 4 is a perspective view of the embodiment illustrated in FIG. 3, but shown in conjunction with a pickup truck, seen in phantom.

As seen in FIG. 1, the utility ramp of the present invention is indicated generally by the reference numeral 10. The ramp 10 may be substantially planar as seen in FIGS. 1 and 2, or, in an alternate embodiment, the ramp 10 may be provided with a generally convex curve along its length, as seen in FIGS. 3 and 4. The embodiment of FIGS. 3 and 4 is especially useful in the event that the object to be elevated is especially low riding, as in the case of a lawn tractor with mowing deck (not shown). The ramp is preferably constructed of a rigid metal such as aluminum, although any other material of sufficient strength may be used. The ramp 10 comprises a unitary traction plate 12 having a first end 14 and a second end 16. The first end 14 includes an integrally formed tongue section 18 adapted for securement to an elevated surface, shown in FIGS. 2 and 4 in phantom as a truck bed 11. The second end 16 of the ramp 10 is provided with an integrally formed foot portion 20. Foot portion 20 is adapted to engagingly support the traction plate 12 at a level lower than the elevated surface. The foot portion 20 includes an arcuate portion 22 defining a plurality of exposed serrations 24. Serrations 24 enable the foot portion 20 to grippingly engage the lower, ground level over a variety of pitch angles. The serrations 24 further prevent undesirable skidding and resulting lack of support.

As best seen in FIGS. 5, 5*a*, and 9, the traction plate 12 further includes oppositely disposed, downwardly formed, substantially coextensive apron portions 34. Each of the apron portions 34 further defines a substantially coextensive, generally U-shaped channel 36. As best seen in FIG. 9, a base portion 38 having a pair of bifurcated leg portions 40*a*, 40*b*, extending therefrom, forms the U-shaped channel 36. Each of the bifurcated legs 40*a*, 40*b* terminates in an arcuate distal end portion, corresponding to the integrally formed arcuate portion 22 of foot portion 20. For added strength, often required when loading or unloading heavy loads, the bifurcated leg portions 40*a* may extend and substantially contact the underside of traction plate 12 as shown in FIG.

5a. This alternate configuration allows a greater number of serrations to be formed in each inner arcuate portion 22 which, in turn, provides greater ramp strength and stability.

As illustrated in FIGS. 6–8, the coextensive panel portions 34 are each provided with at least one hole 42 through which a safety line 44 may pass. In the depicted preferred embodiment, a plurality of holes are provided and the safety line 44 is passed in opposite directions through each hole 42. This provides the benefit of facially adjusting the safety line 44 length with the need for additional tools. As will be readily appreciated from the drawings, a longer safety line 44 length is required when the ramps 10 are spaced closely together while a shorter safety line is preferable when the ramps 10 are widely spaced apart. A hook 45, clasp or similar securing means may be attached to the distal end of each safety line 44. The safety line 44 and hook 45 may be attached to the raised surface, seen as truck bed 11 in FIGS. 2 and 4, for additional security in the event of an unforeseen shift of the ramp 10.

Referring to FIGS. 6 and 7, the tongue section 18 of ramp 10 may be seen in greater detail. The tongue section 18 is integrally formed with, and extending from, the traction plate 12 and is preferably provided with an angled support area 26 that is adapted to receive and engage the raised surface. The angle of support area 26 is preferably such that a smooth transition may be made between the traction plate surface 28 and the raised surface for facile movement of articles from one level to another. The angled leg portion 27 acts as a stop resisting forward movement of the ramp 10.

The peripheral margin 46 of tongue section 18 is preferably surrounded by a U-shaped binder 48 to provide increased friction between the tongue section 18 and elevated surface, to protect the peripheral margin 46 and to further prevent scratching or other damage to the elevated surface to which it is secured. As best seen in FIG. 8a, the U-shaped binder 48 is formed of a conventional molded material defining a bail portion 49 having a pair of bifurcated legs 50a, 50b extending therefrom. The bifurcated legs 50a, 50b each terminate at their distal end 52 with an upstruck barbed portion 54 for retention of the binder 48 relative to the peripheral margin 46 of the tongue section 18. The upstruck-barbed portion 54 extends longitudinally and coextensive with the distal end 52 of each bifurcated leg 50a, 50b. The binder 48 preferably includes a coextensive reinforcement element 62, seen as a metallic strip 62 in FIG. 8a, for durability and added strength. Although a metallic reinforcement element 62 is preferred, any material of sufficient rigidity, such as stiff plastic may also be used.

As shown in FIG. 6, the U-shaped binder 48 may be secured to the peripheral margin 46 by way of an adhesive 56. An alternate means of securing the U-shaped binder 48 is illustrated in FIG. 8. In this embodiment, the peripheral margin 46 of the tongue section 18 is further provided with a series of longitudinally aligned slots 58. The slots 58 are arranged to grippingly receive the upstruck-barbed portion 54 of the U-shaped binder 48. When the binder 48 is used with the slotted tongue section, the barbed portion engages the slots to provide secure attachment.

As seen in FIGS. 1–4, the traction plate may be further provided with a handhold aperture 60 for ease of transport and adjusting prior to loading or unloading. The handhold aperture 60 may be preferably provided with a U-shaped binder 48a, similar in construction and attachment to the binder 48 on the peripheral margin 46 of the tongue section 18.

In the preferred embodiment, the traction plate top surface 28 is provided with a plurality of apertures 30. As seen in FIGS. 7 and 9, the apertures 30 are preferably punched so as to leave extruded or flange portions 32 having an upper edge 32a configured to provide traction and enable breaking through debris or snow. The upper edge, 32a, of aperture 30 is configured so as to provide a surface taper, whereby undesirable sharp edges which may otherwise cut tires or hands are avoided. The apertures 30 extend outwardly from the traction plate top surface 28 and are positioned in regularly spaced, preferably offset rows. It is to be understood that, although a circular aperture 30 is preferred, an aperture of any shape remains within the scope of this disclosure.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A utility ramp for providing a bridge between a ground level surface and a raised surface, said ramp being adapted to facilitate the movement of items from one of said surfaces to the other of said surfaces, said ramp comprising a unitary traction plate; said traction plate including a first end and a second end, said first end including an integrally formed tongue section and said second end including an integrally formed foot section; said tongue section being adapted for securement to said raised surface and said foot section being adapted to engagingly support said traction plate on said ground level; said traction plate is formed from a sheet metal stamping and includes oppositely disposed, downwardly formed, substantially coextensive, panel portions, each panel portion further defining a substantially coextensive, generally U-shaped channel, said channel forming a cross section having a base portion and a pair of bifurcated leg portions extending therefrom; and wherein each of said bifurcated leg portions of said channel includes an arcuate portion defining a plurality of exposed serrations engageable with said ground surface.

2. The ramp of claim 1 wherein the tongue section of said first end includes a U-shaped protective binder attached to the marginal edge of said tongue section.

3. The ramp of claim 1 wherein said traction plate includes a plurality of upwardly protruding projections.

4. The ramp of claim 3 wherein said projections comprise a series of extruded flanges upstanding from punched holes and having a continuous annular surface.

5. The ramp of claim 1 wherein said integrally formed foot section includes an arcuate portion defining a plurality of exposed serrations engageable with said ground surface.

6. The ramp of claim 1 wherein said traction plate includes at least one handhold opening.

7. The ramp of claim 6 wherein said handhold opening includes a portion thereof engageable with a U-shaped protective binder.

8. A utility ramp for providing a bridge between a ground level surface and a raised surface, said ramp being adapted to facilitate the movement of items from one of said surfaces to the other of said surfaces, said ramp comprising a unitary traction plate; said traction plate including a first end and a second end, said first end including an integrally formed tongue section and said second end including an integrally formed foot section; said tongue section being adapted for securement to said raised surface and said foot section being adapted to engagingly support said traction plate on said ground level; said tongue section of said first end including a U-shaped protective binder attached to the marginal edge of said tongue section; and wherein said U-shaped binder includes a bail portion having a pair of bifurcated legs extending therefrom, said legs each terminating in an upstruck barbed portion, said upstruck barbed portion extending longitudinally and coextensive with said binder.

9. The ramp of claim 8 wherein said traction plate includes at least one handhold opening.

10. The ramp of claim 9 wherein said handhold opening includes a portion thereof engageable with a U-shaped protective binder.

11. A utility ramp for providing a bridge between a first surface and a second surface, said ramp comprising:
   a unitary traction plate;
   said traction plate including a first end and a second end;
   said first end having a receptacle integrally formed therein, said receptacle being adapted to receive a predetermined portion of said first surface;
   said second end having a foot member integrally formed therein, said foot member being adapted to engagingly support said traction plate on said second surface;
   said traction plate being formed from a sheet metal stamping and including oppositely disposed, downwardly formed, substantially coextensive panel portions, each panel portion further defining a substantially coextensive, generally U-shaped channel said channel forming a cross section having a base portion and a pair of bifurcated leg portions extending therefrom; and
   wherein each of said bifurcated leg portions of said channel includes an arcuate portion defining a plurality of exposed serrations engageable with said second surface.

12. The ramp of claim 11 wherein the receptacle of said first end includes a U-shaped protective binder attached to a marginal edge of a tongue-shaped projection.

13. The ramp of claim 11 wherein said traction plate includes a plurality of upwardly protruding projections.

14. The ramp of claim 13 wherein said projections comprise a series of extruded flanges upstanding from punched holes and having a continuous annular surface.

15. The ramp of claim 11 wherein said integrally formed foot section includes an arcuate portion defining a plurality of exposed serrations engageable with said second surface.

16. The ramp of claim 11 wherein said traction plate includes at least one handhold opening.

17. The ramp of claim 16 wherein said handhold opening includes a portion thereof engageable with a U-shaped protective binder.

18. A utility ramp for providing a bridge between a first surface and a second surface, said ramp comprising:
   a unitary traction plate;
   said traction plate including a first end and a second end;
   said first end having a receptacle integrally formed therein, said receptacle being adapted to receive a predetermined portion of said first surface;
   said second end having a foot member integrally formed therein, said foot member being adapted to engagingly support said traction plate on said second surface;
   said receptacle of said first end including a U-shaped protective binder attached to a marginal edge of a tongue-shaped projection; and
   wherein said U-shaped binder includes a bail portion having a pair of bifurcated legs extending therefrom, said legs each terminating in an upstruck barbed portion, said upstruck barbed portion extending longitudinally and coextensive with said binder.

* * * * *